United States Patent [19]

Etingov et al.

[11] 4,022,886
[45] May 10, 1977

[54] METHOD OF RECOVERING MYCOHEPTIN

[76] Inventors: Evgeny Davidovich Etingov, ulitsa Zvezdnaya, 8, kv. 43; Alexandr Pavlovich Bashkovich, prospekt M.Toreza, 40, korpus 7, kv. 21; Valter Osvaldovich Kulbakh, ulitsa Bukharestskaya, 86, korpus 1, kv. 85; Valentina Yakovlevna Raigorodskaya, prospekt Narodnogo opolchenia, 131, kv. 126; Inessa Vladimirovna Popova, V. O. 2 linia, 25, kv. 27; Ljudmila Evgenievna Alexeeva, ulitsa Krasnoputilovskaya, 14, kv. 69; Vladimir Semenovich Nyn, Svetlanovsky prospekt, 52, kv. 50; Nadezhda Dmitrievna Lokhina, ulitsa Kupchinskaya, 19, korpus 3, kv. 99, all of Leningrad, U.S.S.R.

[22] Filed: Aug. 12, 1975

[21] Appl. No.: 604,062

[52] U.S. Cl. .............................................. 424/123
[51] Int. Cl.$^2$ ....................................... A61K 35/00
[58] Field of Search ................................... 424/123

[56] References Cited
OTHER PUBLICATIONS

Chemical Abstracts, vol. 70, p. 210, 46191m, 1969.

Primary Examiner—Albert T. Meyers
Assistant Examiner—Daren M. Stephens
Attorney, Agent, or Firm—Steinberg & Blake

[57] ABSTRACT

Mycoheptin, an antifungal antibiotic, is obtained by extracting the antibiotic from the mycelium with a 65 to 80-percent aqueous solution of isopropanol which contains from 1 to 10 percent by weight of calcium chloride and 10 to 15 percent by weight of methylene chloride, precipitating the antibiotic, washing it with aqueous isopropanol, reprecipitating it from a dimethylformamide solution with water, and treating the product with a 20 to 50-percent aqueous solution of n-propanol containing from 0.2 to 0.5 percent by weight of sodium hexametaphosphate.

The novel extracting and reprecipitating agents employed in the process of this invention result in a yield which is 1.5-times that of known methods of mycoheptine recovery from the mycelium as well as in a higher quality of the desired product.

3 Claims, No Drawings

METHOD OF RECOVERING MYCOHEPTIN

The present invention relates to the production of antibiotics; more particularly, it is directed to a process for producing the antibiotic mycoheptin. Mycoheptine is effective against the causal agents of deep-seated and systemic mycoses and yeast-like fungi and is accordingly employed in the therapy of coccidioidomycosis, histoplasmosis, cryptococcosis, chromodermycosis, blastomycosis, aspergillosis, sporotrichosis and candidiasis.

It is known in the art to produce mycoheptin by extracting it from the mycelium of *Streptoverticillium mycoheptinicum* with e.g. lower alcohols such as methanol or isopropanol, and then precipitating the antibiotic from the preliminarily evaporated extracts. The product is then purified and reprecipitated from a dimethylformamide solution. One of the prior art processes for producing mycoheptin comprises extracting mycoheptin from the mycelium with methanol, concentrating the methanol extract under vacuum and precipitating the product by cooling, after which the precipitate is washed with hot ethanol at a temperature of 60° C., dissolved in dimethylformamide, reprecipitated with acetone, washed with acetone and ether, and dried under vacuum. In this known process, the yield of the antibiotic amounts to 20 to 25 percent of its level in the mycelium in terms of activity (Hungarian Pat. No. 155,202; E. V. Borovosky, M.A. Malyshkina, T. V. Kotenko and S. N. Soloview. "Novyi protivogribkovyi antibiotic mikogeptin iz gruppy nearomaticheskikh geptaenov" /Mycoheptine: a Novel Antifungal Antibiotic from the Group of Non-Aromatic Heptaenes/, Zhurnal Antibiotiki /Antibiotics Journal/, Moscow, 1965, No. 9, 776; V. A. Tsyganov, Yu. E. Konev and V. P. Namestnikova. "Kharakteristika aktinomitseta No. 44B/1-produtsenta novogo protivogribkovogo antibiotika mikogeptina" /Characterization of Actinomycete 44B/1, a Producing organism of Mycoheptin, a Noval Antifungal Antibuotic/, "Antibiotiki"/, Mo 1965, No. 10, 599; "Mikogeptin i ego klinicheskoe primenenie" /Mycoheptin and Its Clinical Applications/, Sb. Trudov LNIIA, /Proceedings of the Leningrad Scientific-Research Institute of Antibiotics/, Leningrad, 1973).

The prior art processes have some serious disadvantages, viz. low level of mycoheptin recovery from the mycelium which stems from the poor solubility of the antibiotic in organic solvents such as lower alcohols, as well as a low yield and poor quality of the end product.

It is a cardinal object of the present invention to provide a process with a high level of mycoheptin recovery from the mycelium.

It is a further object of the present invention to provide for a high quality of the desired product.

The foregoing objects are attained in a process of obtaining the antibiotic mycoheptin by extracting the same from the mycelium with an organic solvent, precipitating and purifying the antibiotic, wherein, in accordance with the invention, the extraction of the antibiotic from the mycelium is effected by the use of a 65 to 80-percent aqueous solution of isopropanol containing 1 to 10 percent calcium chloride by weight and 10 to 15 percent methylene chloride by weight, and the purification is effected by washing the precipitated antibiotic with aqueous isopropanol and reprecipitating the antibiotic from a dimethylformamide solution with water followed by the treatment of the product with a 20 to 50-percent aqueous solution of n-propanol containing from 0.2 to 0.5 percent sodium hexametaphosphate by weight.

The extraction is desirably effected by the use of a 65 to 80-percent aqueous solution of isopropanol containing 2 percent calcium chloride by weight and 10 percent methylene chloride by weight; and the antibiotic reprecipitation is desirably effected by the use of a 40-percent aqueous solution of n-propanol containing 0.5 percent sodium hexametaphosphate by weight.

The proposed process of obtaining the antifungal antibiotic mycoheptine is carried out as follows.

The mycelium of Streptoverticillium mycoheptinicum is subjected to extraction with a 65 to 80-percent aqueous solution of isopropanol containing from 1 to 10 percent calcium chloride by weight and from 10 to 15 percent methylene chloride by weight. The extracting agent preferably contains 2 percent calcium chloride by weight and 10 percent methylene chloride by weight. In order to completely recover the antibiotic from the mycelium, the extraction procedure is carried out from 1 to 3 times depending on the level of the antibiotic in the mycelium. The extracts are pooled, concentrated under vacuum, cooled and the antibiotic is precipitated from the concentrate with water. The autibiotic precipitate is separated and purified with aqueous isopropanol, after which the resultant antibiotic paste is separated, washed with acetone and dried under vacuum. The dried antibiotic is reprecipitated from a dimethylformamide solution with water and the resulting antibiotic paste is washed with a 20 to 50-percent aqueous solution of n-propanol containing from 0.2 to 0.5 percent sodium hexametaphosphate by weight. It is preferred that use should be made of a 40-percent aqueous solution of n-propanol containing 0.5 percent sodium hexametophosphate by weight. Then the antibiotic paste is separated, washed with water and acetone, and dried under vacuum. The average yield of the desired product amounts to 33 percent of the antibiotic level in the mycelium in terms of activity.

The novel reagents employed in the instant process at the extraction and reprecipitation stages are conducive to a 1.5-time increase in mycoheptin recovery from the mycelium as well as to a higher quality of the end product.

The present invention will be further understood from the description of the following exemplary embodiments thereof.

EXAMPLE 1

1 kg of mycelium of the strain Streptoverticillium mycoheptinicum 44B/1 having an activity of 5,000 mcg/g is extracted with a 80-percent aqueous solution of isopropanol containing 2 percent calcium chloride by weight and 10 percent methylene chloride by weight, the extracting agent and the mycelium being in the ratio of 5:1 (v/w).

The extracts are pooled and concentrated by evaporation to 1.5 liters at a temperature not exceeding 60° C. and a residual pressure of 10 to 20 mm Hg. The concentrate is cooled down to 5° C. and 2 volumes of water are added thereto. The precipitate is separated and washed with a 50-percent aqueous solution of isopropanol and then with acetone, after which it is dried under vacuum. The dried antibiotic is dissolved in dimethylformamide taken at the rate of 20 volumes per 1 part by weight of the dried powder, after which the insoluble impurities are separated, and the antibiotic is precipitated with 1 volume of water relative to the volume of dimethylformamide. The resultant antibiotic paste is washed with a 40-percent aqueous solution of n-propanol containing 0.5 percent sodium hexametophosphate by weight then with water and acetone, and dried under vacuum to yield 2.33 g of the desired product containing 750 mcg/mg of the host material.

The yield of mycoheptin amounts to 35 percent of its level in the mycelium in terms of activity.

EXAMPLE 2

1.08 kg of mycelium of Streptoverticillium mycoheptinicum 44B/1 having an activity of 4,860 mcg/ is washed with 6 liters of methylene chloride. The antibiotic is extracted from the washed mass three times, the first run being effected by use of a 80-percent aqueous solution of isopropanol containing 2 percent calcium chloride by weight, while the second and third runs use a 65-percent aqueous solution of isopropanol containing 10 percent methylene chloride by weight and 2 percent calcium chloride by weight. The extracting agent and the mycelium are taken in the ratio of 5:1 (v/w). The extracts thus obtained are pooled and concentrated by evaporation to a volume of 1.5 liters at a temperature not exceeding 60° C. and a residual pressure of 10 to 20 mm Hg. The concentrate is cooled down to a temperature of 5° C. and 2 volumes of water are added thereto.

The precipitate is separated, washed with acetone and dried at a residual pressure of 10 mm Hg. The resultant powdered antibiotic containing 165 mcg/mg of the host material is washed with a 50-percent aqueous solution of isopropanol taken at the rate of 50 volumes per 1 part by weight. Then the paste obtained is washed with acetone and dried under vacuum to produce 10.19 g of powdered antibiotic containing 289 mcg/mg of the host material. The powder is dissolved in 200 ml of dimethylformamide, the insoluble impurities are separated, and the antibiotic is precipitated with 1 volume of water relative to the volume of dimethylformamide. The precipitate is separated, washed with acetone and dried at a residual pressure of 10 mm Hg to yield 4.22 g of powdered antibiotic containing 572 mcg/mg of the host material which is washed with 400 ml of a 40-percent aqueous solution of n-propanol containing 0.5 percent sodium hexametophosphate by weight. Then the paste is separated, washed with 400 ml of water and then with acetone, and dried at a residual pressure of 10 mm Hg to yield 2.31 g of the desired product containing 760 mcg/mg of the host material. The yield of mycoheptin is 32.9 percent of its level in the mycelium in terms of activity.

EXAMPLE 3

1 kg of mycelium of the strain Streptoverticillium mycoheptinicum 44B/1 having an activity of 5,000 mcg/ is subjected to extraction with a 70-percent aqueous solution of n-isopropanol containing 8 percent calcium chloride by weight and 15 percent methylene chloride by weight. The extraction procedure is carried out three times at the extractant-mycelium ratio of 5:1. All the subsequent manipulations duplicate those of Example 1. The process yields 2.03 g of the desired product containing 740 mcg/mg of the host material. The yield of mycoheptin is 30 percent of its level in the mycelium in terms of activity.

EXAMPLE 4

Mycoheptin is extracted, precipitated and reprecipitated from a dimethylformamide solution in procedures duplicating those of Example 1. The antibiotic paste obtained by reprecipitation from a dimethylformamide solution is washed with a 20-percent aqueous solution of n-propanol containing 0.5 percent sodium hexametophosphate by weight, then with water and acetone, after which it is dried at a residual pressure of 10 mm Hg to yield 2.3 g of the desired product containing 740 mcg/mg of the host material.

The yield of mycoheptin is 34 percent of its level in the mycelium in terms of activity.

EXAMPLE 5

Mycoheptin is extracted, precipitated and reprecipitated from a dimethylformamide solution in procedures duplicating those of Example 1. The antibiotic paste obtained by reprecipitation from a dimethylformamide solution is washed with a 50-percent aqueous solution of n-propanol containing 0.2 percent sodium hexametaphosphate by weight, then with water and acetone, after which it is dried at a residual pressure of 10 mm Hg to yield 1.94 g of the desired product containing 800 mcg/mg of the host material.

The yield of mycoheptin is 31 percent of its level in the mycelium in terms of activity.

What is claimed is:

1. Method of recovering mycoheptin which comprises extracting mycoheptin from the mycelium of Streptoverticillium mycoheptinicum containing the same with a 65 to 80-percent aqueous solution of isopropanol containing 1 to 10 percent calcium chloride by weight and from 10 to 15 percent methylene chloride by weight, precipitating the mycoheptin therefrom, washing the precipitated mycoheptin with an aqueous solution of isopropanol, dissolving said washed mycoheptin in dimethylformamide, reprecipitating the mycoheptin from said dimethylformamide solution with water, and treating the resulting reprecipitated product with a 20 to 50-percent aqueous solution of n-propanol containing 0.2 to 0.5 percent sodium hexametaphosphate by weight.

2. A process as claimed in claim 1, in which the extraction procedure is effected by use of a 65 to 80-percent aqueous solution of isopropanol containing 2 percent calcium chloride by weight and 10 percent methylene chloride by weight.

3. A process as claimed in claim 1, in which the repreciptitated antibiotic is treated with a 40-percent aqueous solution of n-propanol containing 0.5 percent sodium hexametaphosphate by weight.

* * * * *